United States Patent
Lu

(10) Patent No.: US 12,406,081 B2
(45) Date of Patent: Sep. 2, 2025

(54) METHOD AND APPARATUS FOR PREVENTING PROCESSING BY SECURITY PROCESSOR FROM BEING INTERRUPTED

(71) Applicant: Feitian Technologies Co., Ltd., Beijing (CN)

(72) Inventor: Zhou Lu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 0 days.

(21) Appl. No.: 18/696,628

(22) PCT Filed: Nov. 15, 2022

(86) PCT No.: PCT/CN2022/131830
§ 371 (c)(1),
(2) Date: Mar. 28, 2024

(87) PCT Pub. No.: WO2023/124589
PCT Pub. Date: Jul. 6, 2023

(65) Prior Publication Data
US 2025/0036790 A1 Jan. 30, 2025

(30) Foreign Application Priority Data
Dec. 31, 2021 (CN) .......................... 202111682813.X

(51) Int. Cl.
*G06F 21/62* (2013.01)
*G06F 21/53* (2013.01)
(Continued)

(52) U.S. Cl.
CPC ........ *G06F 21/6218* (2013.01); *G06F 21/575* (2013.01); *G06F 2221/034* (2013.01)

(58) Field of Classification Search
None
See application file for complete search history.

(56) References Cited

U.S. PATENT DOCUMENTS 9,635,029 B2 * 4/2017 Staggs ................ G06F 21/6218
11,449,624 B2 * 9/2022 Fuhry ................. H04L 63/0428
(Continued)

FOREIGN PATENT DOCUMENTS

| CN | 103312517 A | 9/2013 |
|---|---|---|
| CN | 107516215 A | 12/2017 |

(Continued)

OTHER PUBLICATIONS

Platform independent overall security architecture in multi-processor system-on-chip integrated circuits for use in mobile phones and handheld devices. Shkenazi et al. Elsevier. (Year: 2007).*

(Continued)

*Primary Examiner* — Venkat Perungavoor
(74) *Attorney, Agent, or Firm* — Maier & Maier, PLLC

(57) ABSTRACT

A method and apparatus for preventing a processing by a security processor from being interrupted, where the method includes: starting, by an application processor, a security information input page; receiving, switching, by a security processor, a touch panel connection to the security processor; setting, by the application processor, a delay status, calculating a button disable threshold, cancelling an automatic screen shutdown; receiving, by the security processor, security information input by a user through the touch panel, switching the touch panel connection to the application processor; closing, by the application processor, the security information input page, cancelling the delay status, and restoring the automatic screen shutdown. The method further includes: executing, by the application processor, a power button processing according to the button disable threshold and the delay status, when a power button is monitored to be pressed.

20 Claims, 7 Drawing Sheets

(51) Int. Cl.
*G06F 21/57* (2013.01)
*G06F 21/74* (2013.01)
*G06F 21/54* (2013.01)
*G06F 21/71* (2013.01)

(56) References Cited

U.S. PATENT DOCUMENTS

| | | | | |
|---|---|---|---|---|
| 11,842,348 | B2* | 12/2023 | Matsunaga | H04W 4/40 |
| 2005/0114523 | A1* | 5/2005 | Barron | H04L 63/10 |
| | | | | 709/228 |
| 2017/0373853 | A1* | 12/2017 | Soman | H04L 9/3239 |
| 2018/0165471 | A1* | 6/2018 | von Muhlen | G06F 21/6218 |
| 2020/0053091 | A1* | 2/2020 | Childress | H04L 63/102 |
| 2021/0266329 | A1* | 8/2021 | Fuhry | G06F 21/604 |
| 2021/0271209 | A1 | 9/2021 | Bivans et al. | |

FOREIGN PATENT DOCUMENTS

| | | |
|---|---|---|
| CN | 108985767 A | 12/2018 |
| CN | 110351418 A | 10/2019 |
| CN | 110992047 A | 4/2020 |
| CN | 111028414 A | 4/2020 |
| CN | 113177238 A | 7/2021 |
| CN | 114296860 A | 4/2022 |
| EP | 2648129 A1 | 9/2013 |
| WO | 2021000804 A1 | 1/2021 |
| WO | 2021173570 A1 | 9/2021 |

OTHER PUBLICATIONS

International Search Report issued Jan. 28, 2023, in corresponding International Application No. PCT/CN2022/131830; 13 pages.
Concise Explanation of Relevance for Chinese Office Action issued Feb. 28, 2024, in corresponding Chinese Office Action No. 202111682813.X; 10 pages.

* cited by examiner

METHOD AND APPARATUS FOR PREVENTING PROCESSING BY SECURITY PROCESSOR FROM BEING INTERRUPTED

CROSS-REFERENCE TO RELATED APPLICATIONS

This application is a national stage of International Application No. PCT/CN2022/131830, filed on Nov. 15, 2022, which claims priority to Chinese patent application No. 202111682813.X, filed to the China National Intellectual Property Administration on Dec. 31, 2021. Both of the aforementioned applications are hereby incorporated by reference in their entireties.

TECHNICAL FIELD

The present application relates to the field of information technologies and, in particular, to a method and an apparatus for preventing a processing by a security processor from being interrupted.

BACKGROUND

With a development of intelligent terminals, requirements for various aspects of terminal performance are also increasing, and the terminal performance includes security. Therefore, terminals that add security processors on the basis of the existing application processors have occurred, and the security processors provide encryption and security authentication services for the terminals. In the above terminals, an operating system and a power button are controlled by an application processor, and system settings and operations for the power button will trigger the terminal to be locked. If the locking occurs during a processing flow of the security processor, it will cause processes being executed by the security processor to be interrupted. Therefore, how to prevent the processing by the security processor from being interrupted has become an urgent technical problem to be solved.

SUMMARY

The present application provides a method and an apparatus for preventing a processing by a security processor from being interrupted, which is applied to a terminal containing an application processor and a security processor, and solves the above technical problem.

In a first aspect, the present application provides a method for preventing a processing by a security processor from being interrupted, including:

step S1, sending, by an application processor, a switching command to a security processor when starting a security information input page;

step S2, receiving, by the security processor, the switching command, switching a touch panel connection, connecting a touch panel to connect to the security processor, and returning a switching response to the application processor;

step S3, receiving, by the application processor, the switching response, setting a delay status, calculating a button disable threshold based on a preset time, checking a system setting, cancelling an automatic screen shutdown, and sending an input security information operation request to the security processor;

step S4, receiving, by the security processor, the input security information operation request, receiving security information input by a user through the touch panel, switching the touch panel connection when user confirming completed input information or user cancelling input information is received, or an input timeout is confirmed, enabling the touch panel to connect to the application processor, and returning an input security information operation response to the application processor;

step S5, receiving, by the application processor, the input security information operation response, closing the security information input page, cancelling the delay status, and restoring the automatic screen shutdown;

during a process flow of the step S1 to the step S5, executing, by the application processor, a power button processing flow when a power button is monitored to be pressed, and the power button processing flow includes:

step P1, checking, by the application processor, a current screen status; if the current screen status is lit up, executing step P2; if the current screen status is turned off, executing step P3;

step P2, checking, by the application processor, whether the button disable threshold has not been exceeded and the current screen status is in a delay status; if so, stopping the power button processing flow; otherwise, executing a screen shutdown operation, and stopping the power button processing flow;

step P3, executing, by the application processor, a screen lighting operation, and checking whether the current screen status is in the delay status; if so, disabling a screen locking mechanism, and stopping the power button processing flow; otherwise, enabling the screen locking mechanism, and stopping the power button processing flow.

It can be seen that, in the present, by changing a system setting and a power button processing during a period when the security processor obtains control permissions of the touch panel, a problem of the processing by the security processor being interrupted during executing the processing due to the power button and the system setting is avoided.

In a second aspect, the present application also provides an apparatus for preventing a processing by a security processor from being interrupted, the apparatus includes an application processor and a security processor;

where, the application processor includes the following functional units:

a page starting unit, configured to start a security information input page;

a first sending unit, configured to send a switching command to the security processor;

a first receiving unit, configured to receive a switching response returned by the security processor;

a setting unit, configured to set a delay status, calculate a button disable threshold based on a preset time, check a system setting, and cancel an automatic screen shutdown;

a second sending unit, configured to send an input security information operation request to the security processor;

a second receiving unit, configured to receive an input security information operation response returned by the security processor;

a page closing unit, configured to close the security information input page;

a cancel setting unit, configured to cancel the delay status and restore the automatic screen shutdown;

a power button processing unit, configured to check a current screen status when it is monitored that the power button is pressed; if the current screen status is lit on, check whether it has not exceeded the button disable threshold and the current screen status is in the delay status; if so, stop a processing; otherwise, execute a screen shutdown operation; if the current screen status is turned off, execute a screen lighting operation and check whether the current screen status is in the delay status; if so, disable a screen locking mechanism; otherwise, enable the screen locking mechanism;

the security processor includes the following functional units:

- a third receiving unit, configured to receive a switching command sent by the application processor;
- a switching unit, configured to switch a touch panel connection, and connect a touch panel to the security processor;
- a third sending unit, configured to return a switching response to the application processor;
- a fourth receiving unit, configured to receive an input security information operation request sent by the application processor;
- a touch response unit, configured to receive security information input by a user through the touch panel, switch the touch panel connection when user confirming completed input information or user cancelling input information is received, or an input timeout is confirmed, and enable the touch panel to connect to the application processor;
- a fourth sending unit, configured to return an input security information operation response to the application processor.

In a third aspect, the present application also provides a terminal device. The device can be a device that can operate independently or an apparatus that operates within other devices. The device has some or all of the functions of the method described in the first aspect, and the function can be implemented through hardware, or can be implemented by executing corresponding software by the hardware. The hardware or the software includes one or more units or modules corresponding to the above functions;

- in one possible design, a structure of the device includes a processing unit and a storage unit. The processing unit is configured to support the device in executing the corresponding functions in the method provided in the above first aspect. The storage unit is configured to couple with the processing unit, which stores necessary program instructions and data of the device. The device further includes a transceiver unit, where the transceiver is configured to support a communication between the device and other devices. And other devices can be IC cards, mobile devices and the like;
- in one implementation, the device includes a processor and a memory, where the processor executes the method provided in the first aspect by calling a computer program stored in the memory. Above components can be installed on different chips or integrated on the same chip. The present application does not limit a specific implementation form of the above components.

In a fourth aspect, the present application also provides a chip system, where the chip system is deployed in a terminal device. The chip system includes a processor and an interface, where the processor is used to implement the method described in the first aspect through the interface. The chip system is composed of chips, or includes the chip and other discrete components.

In a fifth aspect, the present application also provides a computer-readable storage medium, used to store a computer software instruction used for the above device, where the computer software instruction includes a computer program for executing the method described in the first aspect.

In a sixth aspect, the present application also provides a computer program product, including an instruction which, when running in a computer, enables the computer to execute the method described in the above first aspect.

BRIEF DESCRIPTION OF DRAWINGS

Various other advantages and benefits will become clear to those of ordinary skill in the art through reading a detailed description of specific implementations in the following. Accompanying drawings are only for a purpose of illustrating preferred implementations, and should not be considered as a limitation on embodiments of the present disclosure. And throughout the whole accompanying drawings, same or similar labels represent same or similar components or components with same or similar functions. In the accompanying drawings.

DETAILED DESCRIPTION OF EMBODIMENTS

The present application proposes a method and an apparatus for preventing a processing by a security processor from being interrupted. The following is a detailed description for embodiments of the present application in conjunction with the accompanying drawings. The described embodiments are illustrative and are intended only to explain the present application, and cannot be interpreted as a limitation of the present application.

Technical personnel in this field can understand that, unless otherwise stated, singular forms "one", "one piece of", "said", and "the" used here may also include plural forms. It should be further understood that, wording "including" used in the specification of the present application refers to a presence of features, integers, steps, operations, elements, and/or components, but does not exclude presence or an addition of one or more other features, integers, steps, operations, elements, components, and/or their combinations. It should be understood that, when it is referred that a component is "connected" or "coupled" to another component, it can be directly connected or coupled to other components, or there can also be an intermediate component. In addition, terms "connected" or "coupled" used here may include wireless connections or wireless couplings. The wording "and/or" used here includes all, or any unit, or combinations of one or more associated listed items.

Those skilled in the art can understand that, unless otherwise defined, all terms used here (including technical and scientific terms) have meanings same with general understandings by ordinary of skill in the art to which the present application belongs. It should also be understood that, terms such as those defined in general dictionaries should be understood to have the meanings consistent with those in the context of existing technology, and should not be interpreted with idealized or overly formal meanings unless specifically defined here.

Various embodiments of the present application can be combined with each other, and same or similar concepts or processes may not be repeated in certain embodiments.

A power button described in the present application is a physical button, while a number key, a backspace key, a confirmation key, and a cancel key are touch buttons.

Embodiment 1

Figure 1:
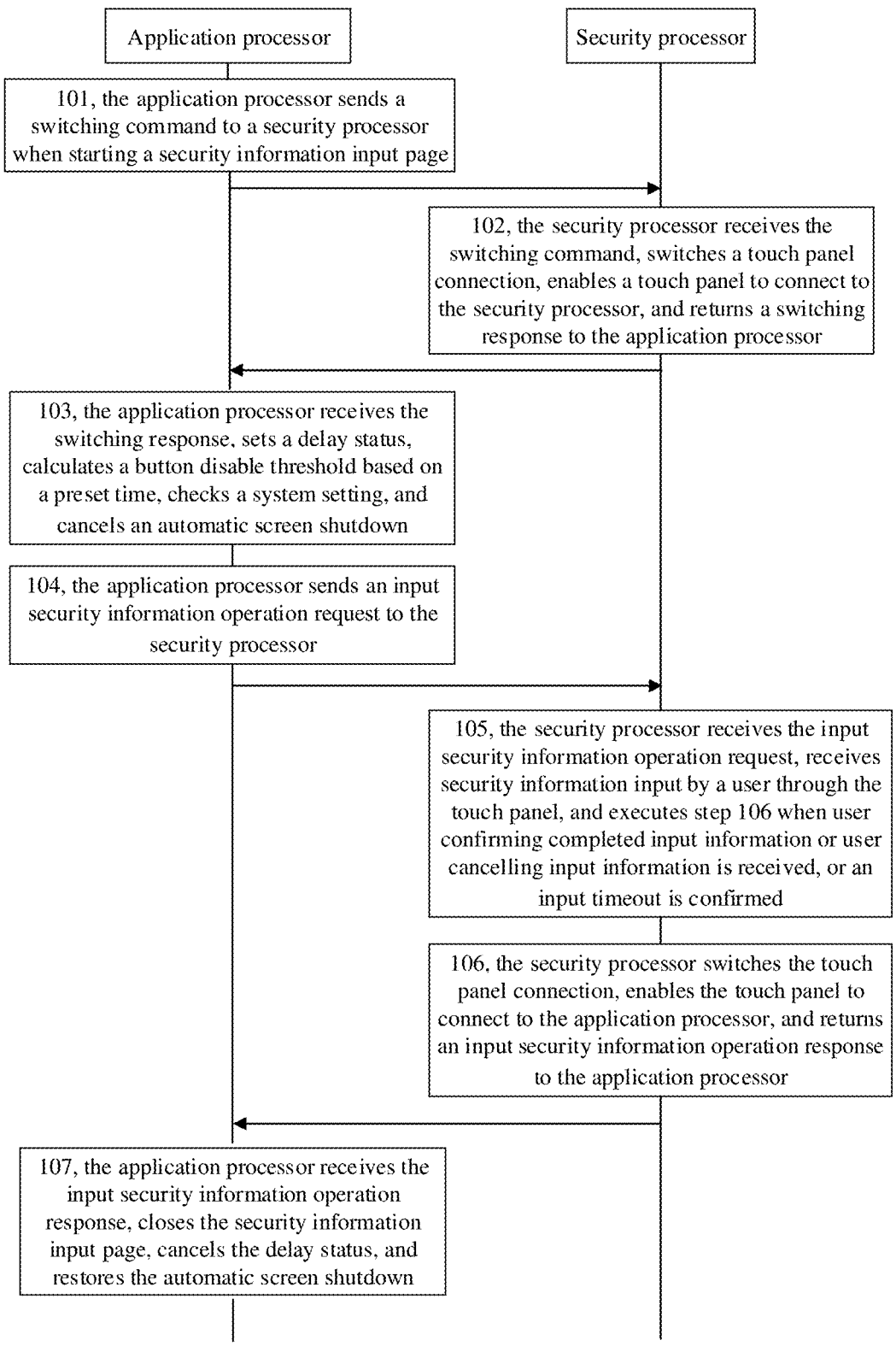
FIG. 1 is a flowchart diagram of a method for preventing a processing by a security processor from being interrupted provided by Embodiment 1 of the present application.

The present application provides a method for preventing a processing by a security processor from being interrupted, which is applicable to a terminal containing an application processor and the security processor, as shown in FIG. 1. The method includes the following steps.

Step 101, an application processor sends a switching command to the security processor when starting a security information input page;

specifically, the security information refers to information that requires encryption, decryption, or authentication by the security processor, such as a PIN (Personal Identification Number, personal identification number) and the like.

Step 102, the security processor receives the switching command, switches a touch panel connection, enables a touch panel to connect to the security processor, and returns a switching response to the application processor;

specifically, after the terminal is turned on, the touch panel is connected to the application processor by default. When receiving the switching command sent by the application processor, the security processor switches the touch panel connection, and enables the touch panel to connect to the security processor.

Step 103, the application processor receives the switching response, sets a delay status, calculates a button disable threshold based on a preset time, checks a system setting, and cancels an automatic screen shutdown;

specifically, the checking the system setting and cancelling the automatic screen shutdown includes: obtaining an automatic screen shutdown time in the system setting, saving the obtained automatic screen shutdown time as temporary data, and setting the automatic screen shutdown time in the system setting as preset data;

the calculating the button disable threshold according to the preset time includes: the application processor obtains a system timestamp, and adds the obtained system timestamp with the preset time to obtain the button disable threshold.

Specifically, the application processor sets the delay status after receiving the switching response, calls a preset custom interface in the application processor, and sets an interface passed-in parameter to a first preset time, where the first preset time meets a first preset condition;

the interface checks an interface passed-in parameter after being called, if the interface passed-in parameter meets the first preset condition, calculates the button disable threshold based on the interface passed-in parameter, checks the system setting, and cancels the automatic screen shutdown.

Step 104, the application processor sends an input security information operation request to the security processor;

step 105, the security processor receives the input security information operation request, receives security information input by a user through the touch panel, and executes step 106 when user confirming completed input information or user cancelling input information is received, or an input timeout is confirmed;

specifically, after the security processor receives the input security information operation request, the following is further included: the security processor sets a timeout period; and correspondingly, the security processor confirming the input timeout specifically includes: the security processor does not receive the user confirming completed input information or the user cancelling input information within the timeout period; where the timeout period is less than the preset time in step 103.

Specifically, the security processor recognizes information input by the user through the touch panel based on keyboard coordinate information on the security information input page; and correspondingly, the switching command sent by the application processor to the security processor includes the keyboard coordinate information on the security information input page;

furthermore, step 105 may specifically include:

step 105-1, the security processor judges whether touch information has been received; if so, executes step 105-2; otherwise, executes step 105-6;

step 105-2, the security processor identifies a touch key clicked by the user based on the touch information and the keyboard coordinate information of the security information input page; if it is a number key or a backspace key, executes step 105-3; if it is a confirmation key, executes a security information verifying operation, and executes step 106; if it is a cancel key, executes step 106; otherwise, executes step 105-6;

step 105-3, the security processor sends a touch key message to the application processor;

step 105-4, the application processor receives the touch key messages, updates a security information input page display, and returns a touch key message response to the security processor;

step 105-5, the security processor receives the touch key message response and executes step 105-6;

step 105-6, the security processor judges whether an input has timed out; if so, executes step 106; otherwise, returns to step 105-1;

step 106, the security processor switches the touch panel connection, enables the touch panel to connect to the application processor, and returns an input security information operation response to the application processor;

where the input security information operation response includes an input timeout of security information, a legitimate verification of security information, a failed verification of security information, and a user cancelling input of security information.

Step 107, the application processor receives the input security information operation response, closes the security information input page, cancels the delay status, and restores the automatic screen shutdown.

Specifically, the restoring the automatic screen shutdown specifically includes: the application processor obtains saved temporary data and changes an automatic screen shutdown time in the system setting to the saved temporary data.

Specifically, after receiving the switching response, the application processor closes the security information input page, cancels the delay status, calls the preset custom interface in the application processor, sets an interface passed-in parameter to a second preset time, where the second preset time meets a second preset condition;

after the interface is called, the application processor checks the interface passed-in parameter; if the interface passed-in parameter meets the second preset condition, restores the automatic screen shutdown.

Figure 2:
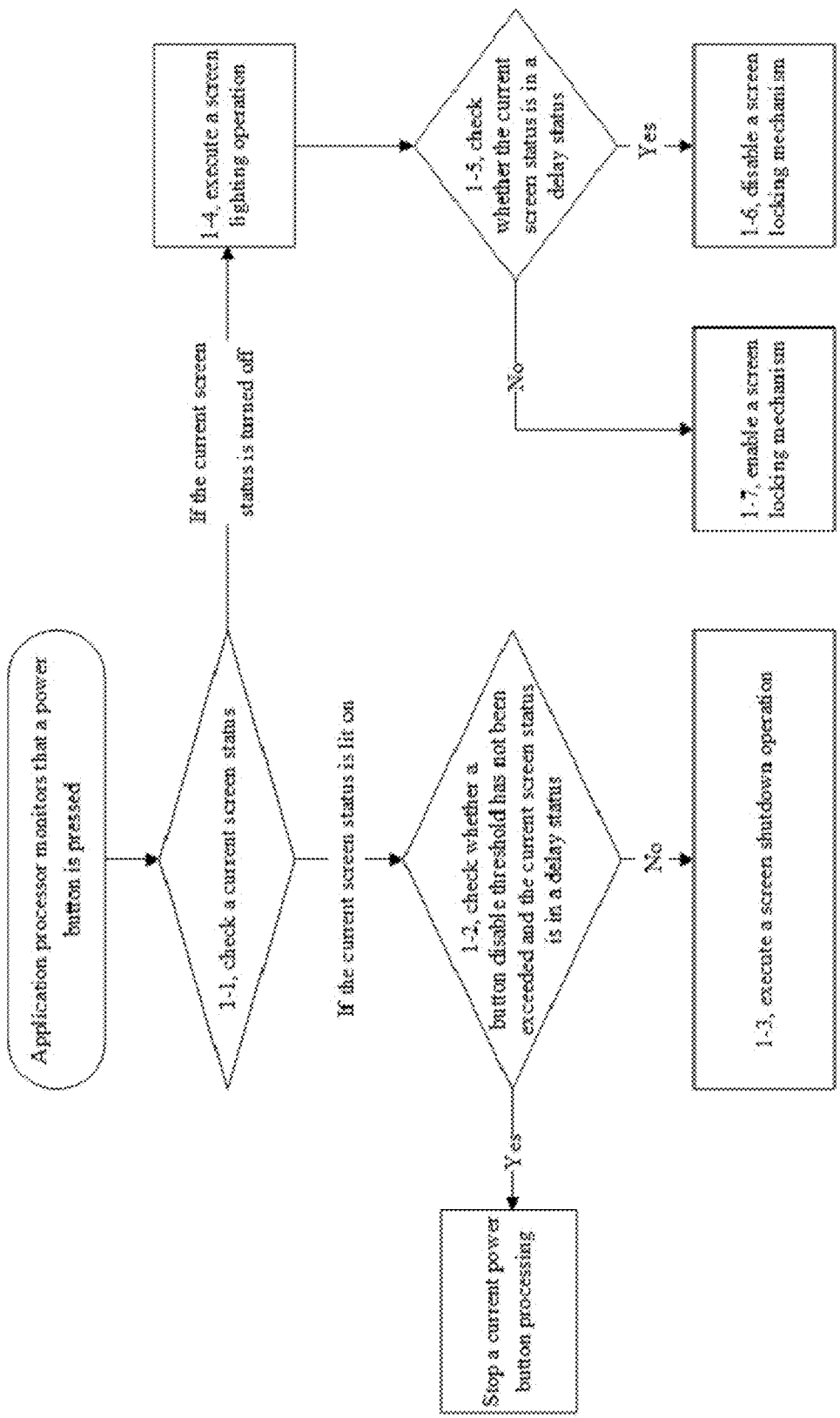
FIG. 2 is a power button processing flow in the method for preventing the processing by the security processor from being interrupted provided by Embodiment 1 of the present application.

During an execution process of the above flow, if the application processor monitors that the power button is pressed, the power button processing flow is executed, as shown in FIG. 2. The power button processing flow includes the following operations executed by the application processor:

step 1-1, check a current screen status; if the current screen status is lit on, execute step 1-2; if the current screen status is turned off, execute step 1-4;

step 1-2, check whether the button disable threshold has not been exceeded and the current screen status is in a delay status; if so, stop the current power button processing; otherwise, execute step 1-3;

specifically, the checking whether the button disable threshold has not been exceeded includes: obtaining the system timestamp; if the obtained system timestamp is less than the button disable threshold, the button disable threshold has not been exceeded; otherwise, the button disable threshold has been exceeded;

step 1-3, execute the screen shutdown operation, then the current power button processing is stopped;

step 1-4, execute a screen lighting operation;

step 1-5, check whether the current screen status is in the delay status; if so, execute step 1-6; otherwise, execute step 1-7;

step 1-6, disable the screen locking mechanism, then the current power button processing is stopped;

step 1-7, enable the screen locking mechanism, then the current power button processing is stopped.

Furthermore, this embodiment, the following is further included: in step 103, after receiving the switching response, the application processor starts a timer and sets a counting time to a preset time, where the preset time is the same with the preset time in the above step 103; correspondingly, in step 107, after receiving the input security information operation response, the application processor disables the timer; correspondingly, the application processor periodically checks the timer to determine whether the timing has ended; and when a checking result shows that the timing of the timer has stopped, cancels the delay status and restores the automatic screen shutdown; and/or, step 1-2 and step 1-3 specifically include:

step 1, check whether the current screen status is in the delay status; if so, execute step 2; otherwise, execute the screen shutdown operation, and stop the power button processing flow;

step 2, check whether the button disable threshold has not been exceeded; if so, stop the power button processing flow; otherwise, execute step 3;

step 3, cancel the delay status, restore the automatic screen shutdown operation, execute the screen shutdown operation, and stop the power button processing flow.

Furthermore, before executing step 3, the following is further included: checking whether there is the saved temporary data; if so, executing step 3; otherwise, executing the screen shutdown operation, and stopping the power button processing flow.

This embodiment changes the system setting and the power button processing during a period when the security processor obtains control permissions of the touch panel, which avoids a problem of the security processor being interrupted during executing the processing flow due to the power button and system setting Embodiment 2

Figure 3A:
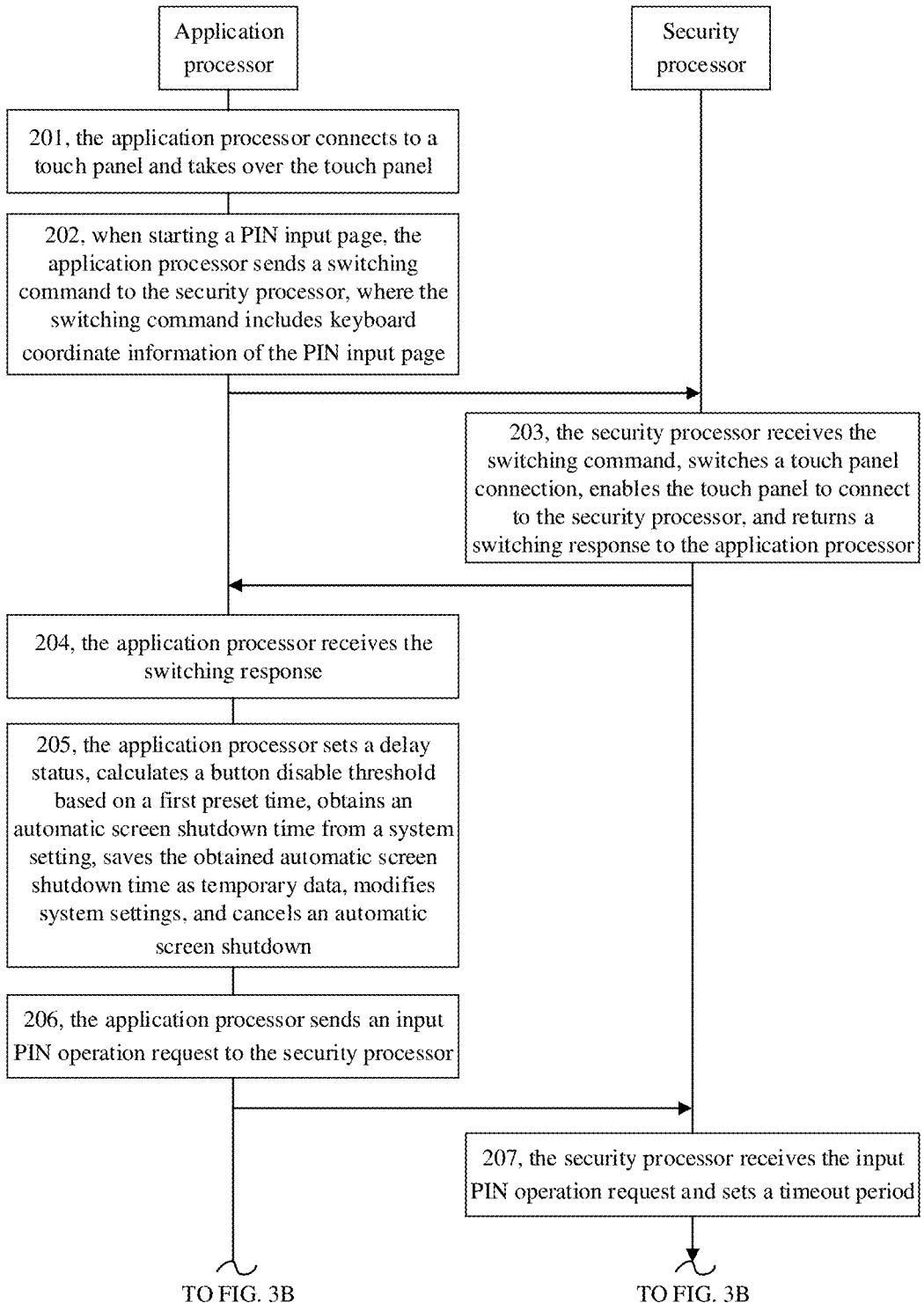
FIGS. 3A, 3B and 3C are flowchart diagrams of a method for preventing a processing by a security processor from being interrupted provided by Embodiment 2 of the present application.
Figure 3B:
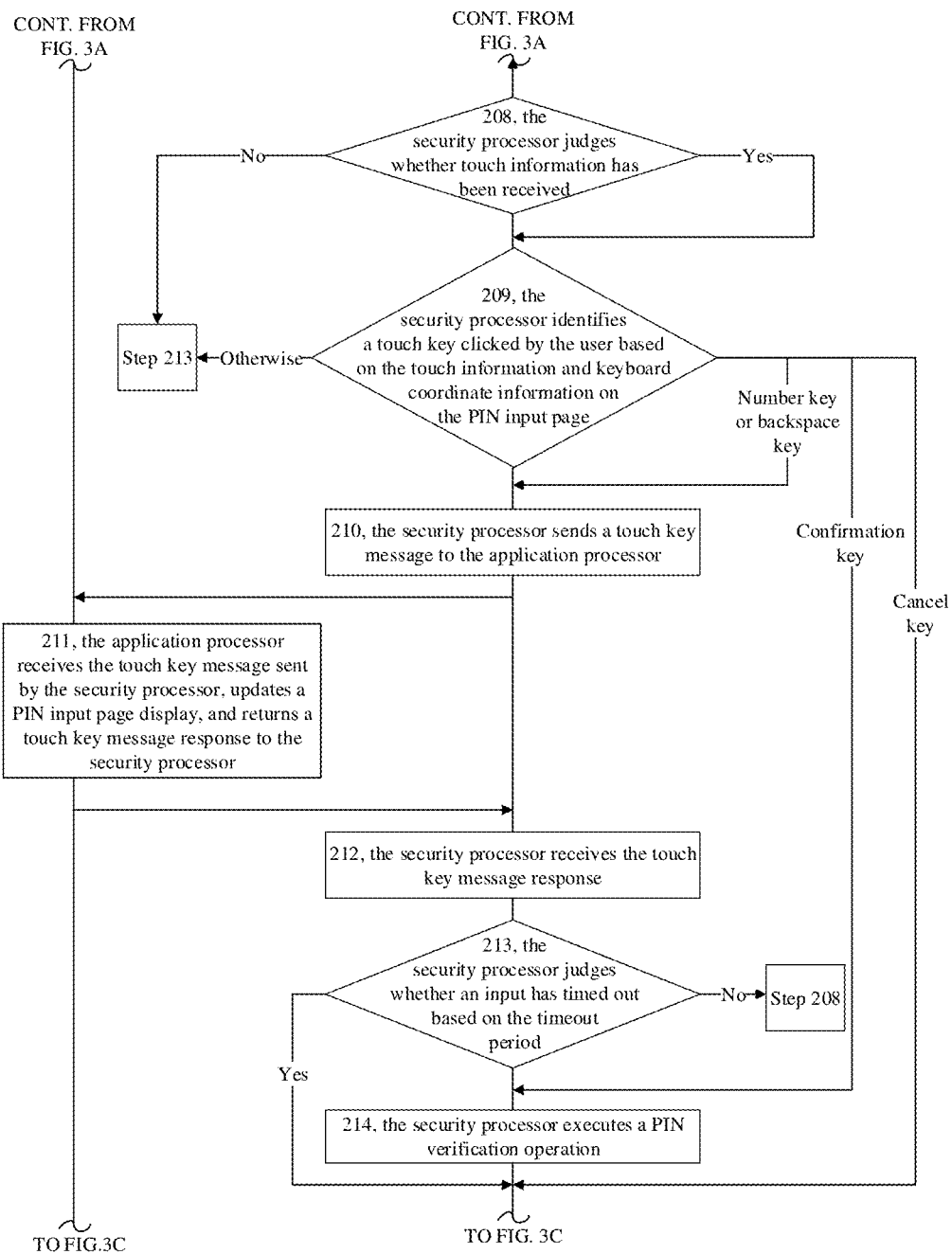
Figure 3C:
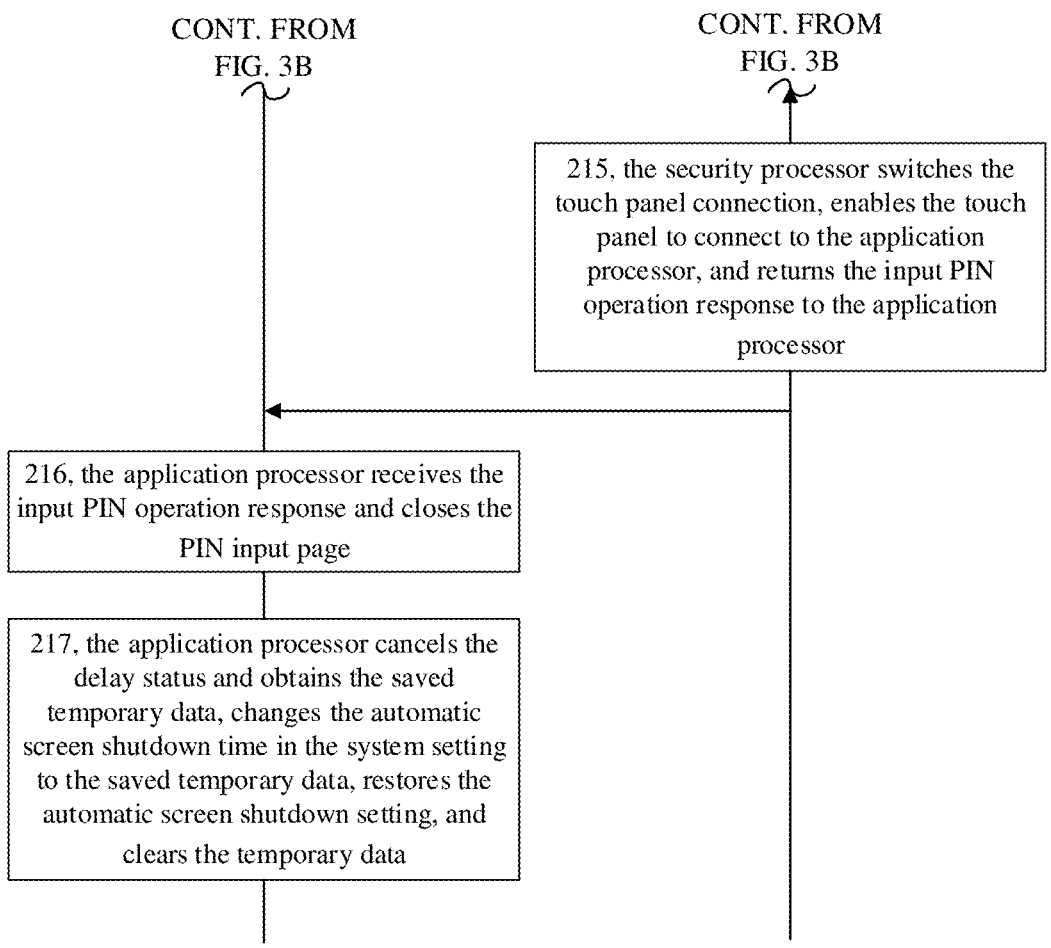

Based on the technical solution provided by the above Embodiment 1, this embodiment provides a possible implementation for a method for preventing a processing by a security processor from being interrupted, as shown in FIGS. 3A, 3B and 3C, which are specific processing flowcharts of this embodiment, including the following steps executed by a terminal after executing a booting operation:

step 201, an application processor connects to a touch panel and takes over the touch panel;

in this embodiment, after the terminal is booted, the application processor is default to connected to a Touch Panel (TouchPanel, short for TP);

specifically, the application processor is connected to an I2C (Inter-Integrated Circuit, inter-integrated circuit) interface of the touch panel.

Step 202, when starting a PIN input page, the application processor sends a switching command to the security processor, where the switching command includes keyboard coordinate information of the PIN input page;

specifically, when a first application (an APP (Application, application) with a front-end display page and requiring to input the PIN) in the application processor starts the PIN input page, it sends a message to a second application (used for handling a communication interface between the application processor and the security processor, a hidden APP in a form of an API (Application Programming Interface, application programming interface)-PosServer (a front-end server)) in the application processor, where the message contains the keyboard coordinate information for the PIN input page; and after receiving the message, the PosServer uses a serial communication to send a switching command that contains the keyboard coordinate information of the PIN input page to the security processor.

Step 203, the security processor receives the switching command, switches a touch panel connection, enables the touch panel to connect to the security processor, and returns a switching response to the application processor;

specifically, the security processor switches an I2C connection of the touch panel, enables the I2C interface of the touch panel to connect to the security processor; and the security processor uses the serial communication to return the switching response to the PosServer.

Step 204, the application processor receives the switching response;

specifically, the first application of the application processor receives the switching response returned by the security processor through the PosServer.

Step 205, the application processor sets a delay status, calculates a button disable threshold based on a first preset time, obtains an automatic screen shutdown time from a system setting, saves the obtained automatic screen shutdown time as temporary data, modifies the system setting, and cancels an automatic screen shutdown;

specifically, after receiving the switching response returned by the security processor through the PosServer, the first application of the application processor sets the delay status, calls a preset custom interface in the application processor, and sets an interface passed-in parameter to be as the first preset time;

where the preset custom interface is used to disable and un-disable the power button and the screen locking mechanism; when the preset custom interface is called, if the interface passed-in parameter meets the first preset condition, the power button or the screen locking mechanism will be disabled, and the automatic screen shutdown mechanism will be disabled. That is, the "calculating the button disable threshold based on the first preset time, obtaining the automatic screen shutdown time in the system setting, saving the obtained automatic screen shutdown time as the temporary data, modifying the system setting, and cancelling the automatic screen shutdown" will be executed. If the interface passed-in parameter meets the second preset condition, the power button, the screen locking mechanism, and the automatic screen shutdown mechanism will be un-disabled. Please refer to the following for specific execution steps;

the first preset condition is that the interface passed-in parameter is an integer greater than 0, measured in seconds; and the second preset condition is preferably that the interface passed-in parameter is equal to 0, measured in seconds;

for example, the above first preset time is 22 seconds.

Specifically, the application processor calculates the button disable threshold based on the first preset time, including: the application processor obtains a system timestamp, where the system timestamp is measured in milliseconds, and the button disable threshold is calculated based on the formula: the system timestamp currently obtained+the first preset time×1000.

Specifically, the application processor sets the delay status, including: the application processor assigns a value of the first preset time to the delay time.

Specifically, the application processor calls the system function Settings.System.getLong(mContext.getContentResolver( )),Settings.System.SCREEN_OFF_TIMEOUT), obtains the automatic screen shutdown time in the system setting based on a return value of this function, saves the obtained automatic screen shutdown time as the temporary data, and calls a system API interface Settings.System.putLong(mContext.getContentResolver( )),Settings.System.SCREEN_OFF_TIMEOUT, preset data), sets the automatic screen shutdown time in the system setting as the preset data, where the preset data preferred is a preset value of 2147483647, which means that the automatic screen shutdown time in the system setting is set to never (i.e., no automatic screen shutdown is executed any more).

Step 206, the application processor sends an input PIN operation request to the security processor;

specifically, the first application of the application processor sends the input PIN operation request to the security processor through the PosServer by using a serial communication.

Step 207, the security processor receives the input PIN operation request and sets a timeout period;

specifically, the security processor receives the input PIN operation request sent by the PosServer through using the serial communication;

in this embodiment, the security processor obtains a pre-saved timeout period, or the security processor obtains the timeout period from the PIN input operation request sent by the application processor; or between the step 205 and step 206, the following is further included: the application processor sends the timeout period to the security processor, and the security processor receives the timeout period; where the timeout period is less than the first preset time, preferably 20 seconds.

Step 208, the security processor judges whether touch information has been received; if so, executes step 209; otherwise, executes step 213;

step 209, the security processor identifies the touch key clicked by the user based on the touch information and the keyboard coordinate information on the PIN input page; if it is a number key or a backspace key, executes step 210; if it is a confirmation key, executes step 214; if it is a cancel key, executes step 215; otherwise, executes step 213;

specifically, the security processor identifies the touch key clicked by the user based on a position where the user clicked on the touch panel and the keyboard coordinate information on the PIN input page.

Step 210, the security processor sends a touch key message to the application processor;

specifically, the security processor sends the touch key message to the PosServer through a reverse instruction request method.

Preferably, when the security processor identifies the touch key clicked by the user as the number key based on the touch information and keyboard coordinate information on the PIN input page, the security processor sends the touch key message to the application processor, specifically including: a message is sent by the security processor to the application processor to notify the application processor that the number key has been clicked, where the message does not contain specific key values or numbers.

Step 211, the application processor receives the touch key message sent by the security processor, updates the PIN input page display, and returns a touch key message response to the security processor;

specifically, the first application of the application processor receives the touch key message sent by the security processor through the PosServer.

The updating the PIN input page display, for example, is adding/removing one "*" in a PIN input box on the PIN input page, accordingly.

Specifically, the PosServer returns, through the reverse instruction response method, the response to the key message from the first application of the application processor to the security processor, where the response to the key message of the first application of the application processor is specifically a display status of the key message.

Step 212, the security processor receives the touch key message response; step 213, the security processor judges whether the input has timed out based on the timeout period; if so, executes step 215; otherwise, returns to step 208;

step 214, the security processor executes a PIN verification operation and executes step 215;

step 215, the security processor switches the touch panel connection, enables the touch panel to connect to the application processor, and returns the input PIN operation response to the application processor;

specifically, the security processor switches an I2C connection of the touch panel, enables the I2C interface of the touch panel to connect to the security processor;

the security processor uses the serial communication to return the input PIN operation response to the Pos- Server; where the PIN input operation response includes a PIN input timeout, a PIN legitimate verification, a PIN failed verification, a user cancelling PIN input, etc.

Step 216, the application processor receives the input PIN operation response and closes the PIN input page;

specifically, the first application of the application processor receives the input PIN operation response returned by the security processor through the Pos-Server, and closes the PIN input page.

Step 217, the application processor cancels the delay status and obtains the saved temporary data, changes the automatic screen shutdown time in the system setting to the saved temporary data, restores the automatic screen shutdown setting, and clears the temporary data.

Specifically, the application processor calls the preset custom interface in the application processor and sets the interface passed-in parameter to the second preset time;

as mentioned earlier, the preset custom interface is used to disable and un-disable the power button and the screen locking mechanism; when the preset custom interface is called, if the interface passed-in parameter meets the first preset condition, the power button or the screen locking mechanism will be disabled, and the automatic screen shutdown mechanism will be disabled. The specific execution steps are shown in the previous text. If the interface passed-in parameter meets the second preset condition, the power button, the screen locking mechanism, and the automatic screen shutdown mechanism will be disabled. That is, the "obtaining the saved temporary data; changing the automatic screen shutdown time in the system setting to the saved temporary data, restoring the automatic screen shutdown setting, and clearing the temporary data" will be executed. The first preset condition is that the interface passed-in parameter is an integer greater than 0, measured in seconds; and the second preset condition is preferably that the interface passed-in parameter is equal to 0, measured in seconds; correspondingly, the above second preset time is preferably 0 seconds.

Specifically, the application processor obtains the saved temporary data and calls the system function Settings.System.putLong(mContext.getContentResolver( )),Settings.System.SCREEN_OFF_TIMEOUT, saved temporary data), sets the automatic screen shutdown time in the system setting to the saved temporary data; that is, the automatic screen shutdown setting is restored.

Specifically, the application processor cancels the delay status, including: the application processor assigns the value of the second preset time to the delay time.

Figure 4:
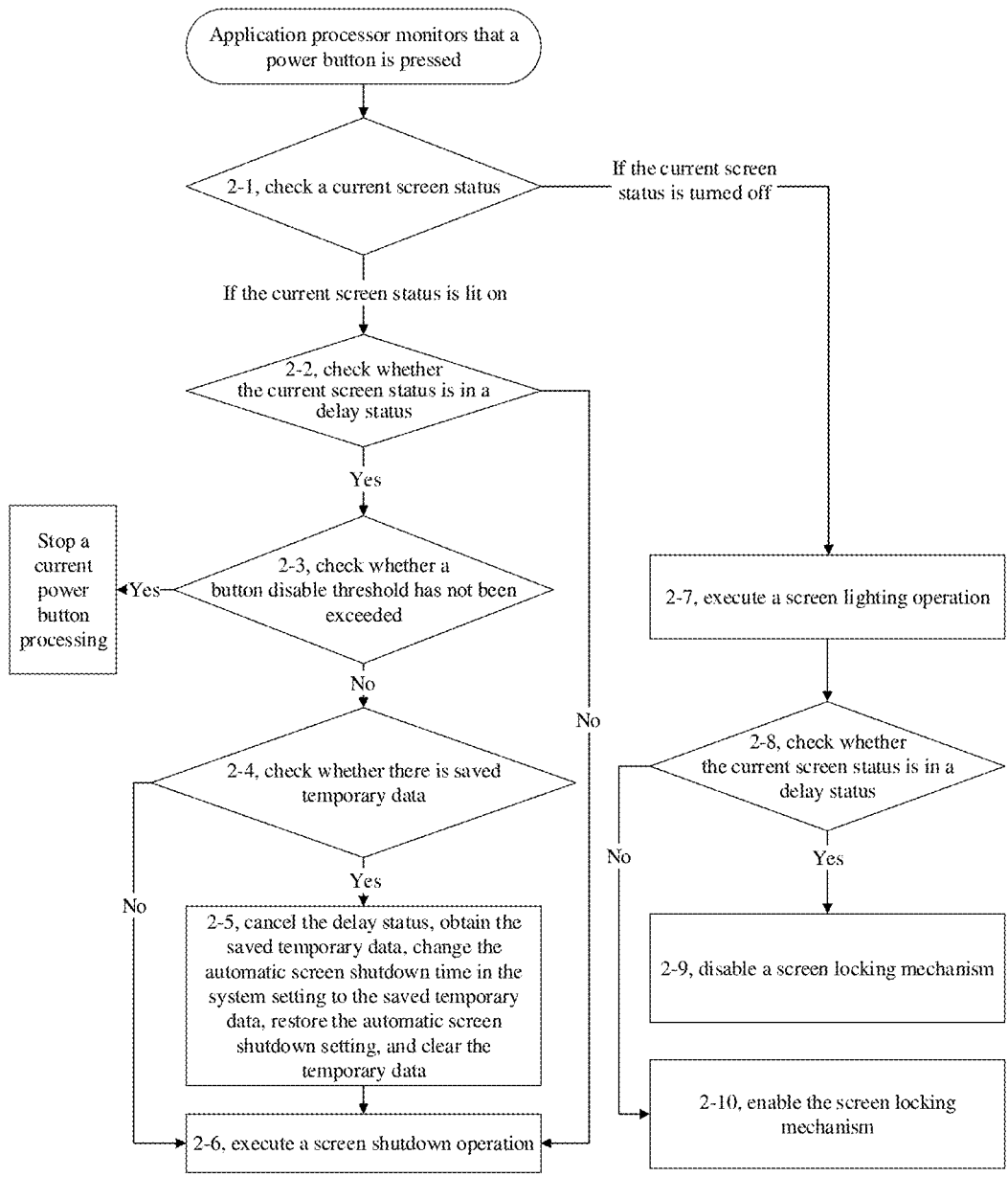
FIG. 4 is a power button processing flow in the method for preventing the processing by the security processor from being interrupted provided by Embodiment 2 of the present application.

During executing the above processing flow, if the application processor monitors that the power button is pressed, the power button processing flow is triggered, as shown in FIG. 4. The power button processing flow includes the following steps executed by the application processor.

Step 2-1, check a current screen status; if the current screen status is lit on, execute step 2-2; if the current screen status is turned off, execute step 2-7;

specifically, the application processor calls the system function PowerManager.isScreenOn; if the function returns "true", the current screen state is lit on, executes step 2-2; if the function returns "false", the current screen state is turned off, executes step 2-7.

Step 2-2, check whether the current screen status is in the delay status; if so, execute step 2-3; otherwise, execute step 2-6;

specifically, the checking whether the current screen status is in the delay status includes: checking the delay time; if a value of the delay time is equal to the first preset time, the current screen status is in the delay status; and if the value of the delay time is equal to the second preset time, the current screen status is not in the delay status.

Step 2-3, check whether the button disable threshold has not been exceeded; if so, stop the current power button processing; otherwise, execute step 2-4;

furthermore, the checking whether the button disable threshold has not been exceeded specifically includes: obtaining the system timestamp, comparing the currently obtained system timestamp with the button disable threshold; if the currently obtained system timestamp is less than the button disable threshold, the button disable threshold has not been exceeded; otherwise, the button disable threshold has been exceeded.

Step 2-4, check whether there is any saved temporary date; if so, execute step 2-5; otherwise, execute step 2-6;

Step 2-5, cancel the delay status, obtain the saved temporary data, change the automatic screen shutdown time in the system setting to the saved temporary data, restore the automatic screen shutdown setting, and clear the temporary data; then execute step 2-6;

an implementation of step 2-5 is the same as that of step 217 and will not be elaborated here.

Furthermore, step 2-5 may further include: closing the PIN input page.

Step 2-6, execute a screen shutdown operation, then the current power button processing is stopped;

the screen shutdown operation is a systematic prior art, which will not be limited in the present application.

Step 2-7, execute a screen lighting operation;

the screen lighting operation is the systematic prior art, which will not be limited in the present application.

Step 2-8, check whether the current screen status is in the delay status; if so, execute step 2-9; otherwise, execute step 2-10;

specifically, the application processor checks the delay time; if the value of the delay time is equal to the first preset time, the current screen status is in the delay status; and if the value of the delay time is equal to the second preset time, the current screen status is not in the delay status.

Step 2-9, disable the screen locking mechanism, then the current power button processing is stopped;

specifically, the application processor calls the system function handleKeyguardDone( ) to disable the screen locking mechanism.

Step 2-10, enable the screen locking mechanism, then the current power button processing is stopped.

Specifically, the application processor calls the system function handleShow(Bundle options) and the system function handleNotifyScreenTurndOn( ) to enable the screen locking mechanism.

Preferably, in this embodiment, step 205 may further includes: the application processor starts the timer, where the counting time of the timer is equal to the first preset time;

in step 216, it may also include: the application processor disables the timer;

in step 2-5, it may also include: the application processor disables the timer;

the above executing process of the processing flow also includes: after the application processor starts the timer, the application processor timely checks whether a timing of the timer has ended until the timer is disabled.

When a check result is that the timing of the time has ended, the application processor executes step 3-0, and a timing check cycle is preferably 1 second;

step 3-0, cancel the delay status, obtain the saved temporary data, change the automatic screen shutdown time in the system setting to the saved temporary data, restore the automatic screen shutdown setting, and clear the temporary data.

The implementation of step 3-0 is the same as that of step 217 and will not be elaborated here.

Furthermore, step 3-0 may further include: the application processor closes the PIN input page.

Embodiment 3

Figure 5:
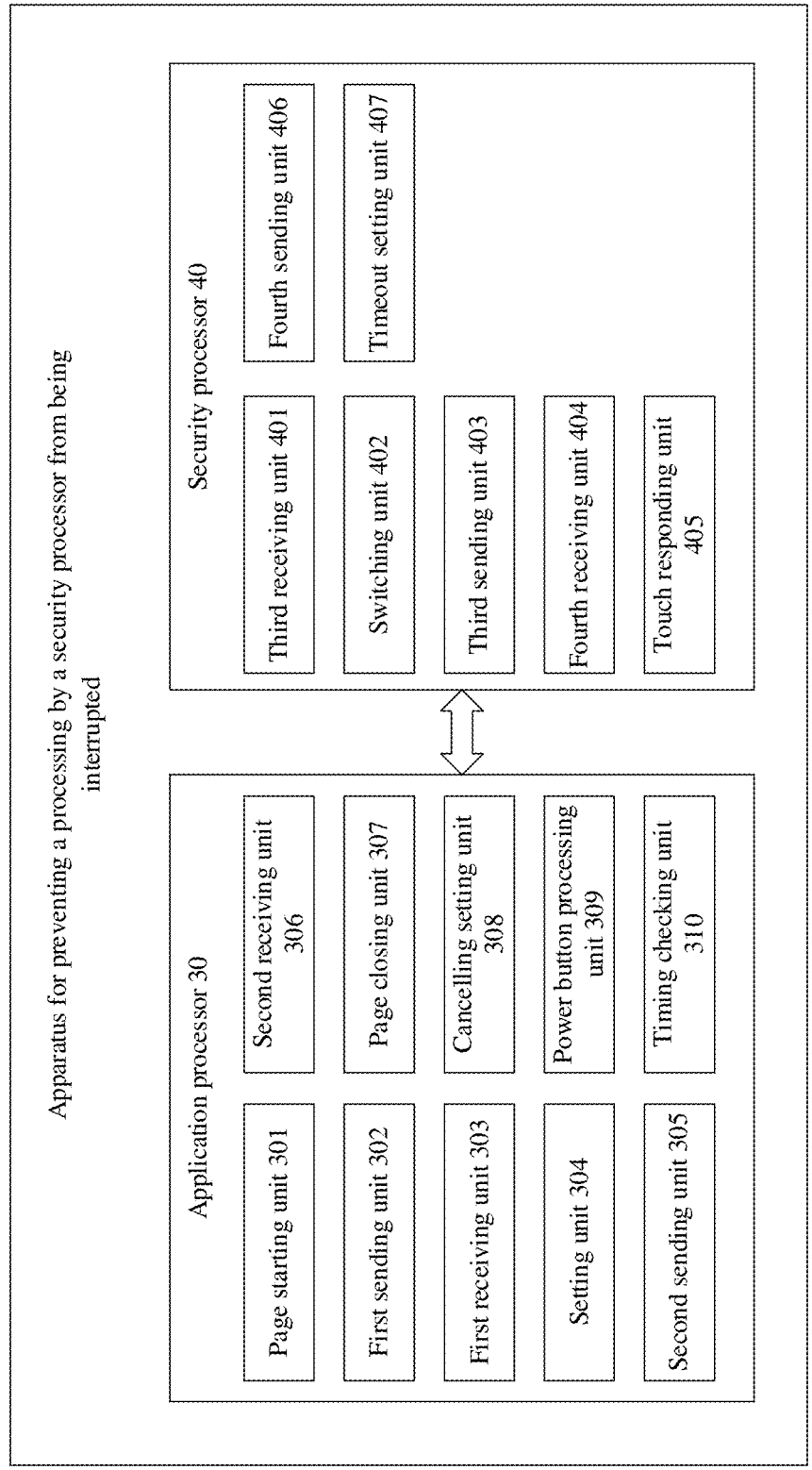
FIG. 5 is a schematic diagram of an apparatus for preventing a processing by a security processor from being interrupted provided by Embodiment 3 of the present application.

This embodiment provides an apparatus for preventing a processing by a security processor from being interrupted, based on the aforementioned described method. As shown in FIG. 5, the apparatus specifically includes: an application processor 30 and a security processor 40;

where the application processor 30 includes the following functional units: a page startup unit 301, configured to start a security information input page;
a first sending unit 302, configured to send a switching command to the security processor;
a first receiving unit 303, configured to obtain a switching response returned by the security processor;
a setting unit 304, configured to set a delay status, calculate a button disable threshold based on a preset time, check a system setting, and cancel an automatic screen shutdown;
a second sending unit 305, configured to send an input security information operation request to the security processor;
a second receiving unit 306, configured to receive an input security information operation response returned by the security processor;
a page closing unit 307, configured to close the security information input page;
a cancelling setting unit 308, configured to cancel the delay status and restore the automatic screen shutdown;
a power button processing unit 309, configured to check a current screen status when it is monitored that the power button is pressed; if the current screen status is lit on, check whether the current screen status has not exceeded the button disable threshold and the current screen status is in the delay status; if so, stop a processing; otherwise, execute a screen shutdown operation; if the current screen status is turned off, execute a screen lighting operation and check whether the current screen status is in the delay status; if so, disable a screen locking mechanism; otherwise, enable the screen locking mechanism;
where the security processor 40 includes the following functional units:
a third receiving unit 401, configured to receive the switching command sent by the application processor;
a switching unit 402, configured to switch a touch panel connection, enable the touch panel to connect to the security processor;
a third sending unit 403, configured to return the switching response to the application processor;
a fourth receiving unit 404, configured to receive an input security information operation request sent by the application processor;
a touch responding unit 405, configured to receive security information input by a user through the touch panel, switch the touch panel connection when user confirming completed input information or user cancelling input information is received, or an input timeout is confirmed, and enable the touch panel to connect to the application processor;
a fourth sending unit 406, configured to return an input security information operation response to the application processor.

In one possible implementation, the security processor 40 further includes a timeout setting unit 407, configured to set a timeout period.

In one possible implementation, the setting unit 304 of the application processor 30 is further configured to start a timer, set a counting time to the preset time, and accordingly:
the cancelling setting unit 308 is further configured to disable the timer;
and the application processor 30 further includes a timing checking unit 310, configured to timely check whether a timer timing has ended; when a check result is that the timer timing has ended, cancel the delay status, and restore the automatic screen shutdown.

In this embodiment, functional implementation sequence and triggering mechanisms of each functional unit can refer to a step execution sequence in the described method embodiment, and will not be elaborated here. And specific limitations of technical features involved in this embodiment can also refer to records in the embodiments describing the method, which will not be elaborated here.

In an implementation, the present application also provides a terminal device, including a processor, a memory, and instructions stored in the memory that can be executed by the processor. The processor executes the instructions to implement the methods described in the above embodiments. Of course, the memory can also be excluded from the device. The device can be an independent device or a chip, a chip system, or a processor that supports the device for implementing the above methods. When the device is the chip system, it can be composed of chips or may include chips and other discrete devices, the present embodiment does not provide specific limitations on this; and the chip is coupled with the memory for executing computer programs stored in the memory to execute the methods described in the above embodiments.

In the above embodiments, it can be fully or partially implemented through software, hardware, firmware, or any combination thereof. When implemented using the software programs, it can be fully or partially implemented in the form of computer program products. The computer program product includes one or more computer programs. When the computer program is loaded and executed, all or part of the processes or functions described in the embodiments of the present application are generated. The computer program can be stored in a computer-readable storage medium, or be transmitted from one computer-readable storage medium to another. For example, the computer instructions can be transmitted from one base station, registration apparatus, server, or data center via a wired (such as coaxial cable, fiber optic, digital subscriber line (digital subscriber line, DSL)) or wireless (such as infrared, wireless, microwave and the like) manner to another base station, registration apparatus, server, or data center. The computer-readable storage medium may be any available medium that can be accessed by the registration apparatus, or may include one or more data storage devices such as servers and data centers that can be integrated with the medium. The available media can be magnetic medias (such as floppy disks, hard drives, magnetic tapes), optical medias (such as DVD (Digital Video Disk, digital video disk)), or semiconductor medias (such as solid state disks (solid state disk, SSD)), and the like.

Although the present application has been described in conjunction with specific features and embodiments, it is evident that various modifications and combinations can be made without departing from a spirit and scope of the present application. Correspondingly, this specification and the accompanying drawings are only exemplary explanations of the present application as defined by the accompanying claims, and are deemed to cover any and all modifications, variations, combinations, or equivalents within the scope of the present application. Obviously, those skilled in the art can make various modifications and variations to the present application without departing from the spirit and scope of the present application. In this way, if these modifications and variations of the present application fall within the scope of the claims and its equivalent technologies of the present application, the present application also intends to include these modifications and variations.

The invention claimed is:

1. A method for preventing a processing by a security processor from being interrupted, the method comprising:
   step S1, sending, by an application processor, a switching command to the security processor when starting a security information input page;
   step S2, receiving, by the security processor, the switching command, switching a touch panel connection, enabling a touch panel to connect to the security processor, and returning a switching response to the application processor;
   step S3, receiving, by the application processor, the switching response, setting a delay status, calculating a button disable threshold based on a preset time, checking a system setting, cancelling an automatic screen shutdown, and sending an input security information operation request to the security processor;
   step S4, receiving, by the security processor, the input security information operation request, receiving security information input by a user through the touch panel, switching the touch panel connection when user confirming completed input information or user cancelling input information is received, or an input timeout is confirmed, enabling the touch panel to connect to the application processor, and returning an input security information operation response to the application processor;
   step S5, receiving, by the application processor, the input security information operation response, closing the security information input page, cancelling the delay status, and restoring the automatic screen shutdown;
   during a process flow of the step S1 to the step S5, executing, by the application processor, a power button processing flow when a power button is monitored to be pressed, and the power button processing flow comprises:
   step P1, checking, by the application processor, a current screen status; if the current screen status is lit up, executing step P2; if the current screen status is turned off, executing step P3;
   step P2, checking, by the application processor, whether the button disable threshold has not been exceeded and the current screen status is in a delay status; if so, stopping the power button processing flow; otherwise, executing a screen shutdown operation, and stopping the power button processing flow;
   step P3, executing, by the application processor, a screen lighting operation, and checking whether the current screen status is in the delay status; if so, disabling a screen locking mechanism, and stopping the power button processing flow; otherwise, enabling the screen locking mechanism, and stopping the power button processing flow.

2. The method according to claim 1, wherein,
   in the step S4, after receiving, by the security processor, the input security information operation request, the method further comprises: setting, by the security processor, a timeout period; and
   in the step S4, the input timeout is that the user confirming completed input information or the user cancelling input information is not received during the timeout period;
   wherein the timeout period is less than the preset time.

3. The method according to claim 1, wherein,
   in the step S3, after receiving, by the application processor, the switching response, the method further comprises: starting, by the application processor, a timer, and setting a counting time as the preset time; and
   in the step S5, after receiving, by the application processor, the input security information operation response, the method further comprises: disabling, by the application processor, the timer;
   and the method further comprises: timely checking, by the application processor, whether a timing of the timer has ended, when a checking result is that the timing of the timer has ended, cancelling the delay status, restoring the automatic screen shutdown.

4. The method according to claim 1, wherein the step P2 comprises:
   step P2-1, checking, by the application processor, whether the current screen status is in the delay status; if so, executing step P2-2; otherwise, executing a screen shutdown operation, and stopping a current power button processing flow;
   step P2-2, checking, by the application processor, whether the button disable threshold has not been exceeded; if so, stopping the current power button processing flow; otherwise, executing step P2-3;
   step P2-3, cancelling, by the application processor, the delay status, restoring the automatic screen shutdown, executing the screen shutdown operation, and stopping the current power button processing flow.

5. The method according to claim 4, wherein, the checking the system setting and cancelling the automatic screen shutdown comprises:
   obtaining, by the application processor, an automatic screen shutdown time in the system setting, saving the obtained automatic screen shutdown time as temporary data, and setting the automatic screen shutdown time in the system setting as preset data; and
   the restoring the automatic screen shutdown comprises: obtaining, by the application processor, the saved temporary data, changing the automatic screen shutdown time in the system setting as the saved temporary date, and clearing the saved temporary date.

6. The method according to claim 5, wherein the step P2-3 comprises: checking, by the application processor, whether the saved temporary data exists; if so, cancelling the delay status and restoring the automatic screen shutdown, executing the screen shutdown operation, and stopping the current power button processing flow; otherwise, executing the screen shutdown operation, and stopping the current power button processing flow.

7. The method according to claim 1, wherein,
the calculating the button disable threshold according to the preset time comprises: obtaining, by the application processor, a system timestamp, and adding the obtained system timestamp with the preset time to obtain the button disable threshold; and
the checking whether the button disable threshold has not been exceeded comprises: obtaining, by the application processor, the system timestamp, if the obtained system timestamp is less than the button disable threshold, the button disable threshold has not been exceeded; otherwise, the button disable threshold has been exceeded.

8. The method according to claim 1, wherein the switching command comprises keyboard coordinate information in the security information input page, and the security processor identifies information input by the user through the touch panel according to the keyboard coordinate information in the security information input page.

9. The method according to claim 8, wherein the step S4 comprises:
step S4-1, receiving, by the security processor, the input security information operation request,
step S4-2, judging, by the security processor, whether touch information has been received; if so, executing step S4-3; otherwise, executing step S4-7;
step S4-3, identifying, by the security processor, a touch key clicked by the user according to the touch information and the keyboard coordinate information of the security information input page; if the touch key is a number key or a backspace key, executing step S4-4; if the touch key is a confirmation key, executing a security information verifying operation, and executing step S4-8; if the touch key is a cancel key, executing step S4-8; otherwise, executing step S4-7;
step S4-4, sending, by the security processor, a touch key message to the application processor;
step S4-5, receiving, by the application processor, the touch key message, updating a security information input page display, and returning the touch key message response to the security processor;
step S4-6, receiving, by the security processor, the touch key message response and executing step S4-7;
step S4-7, judging, by the security processor, whether an input has timed out; if so, executing step S4-8; otherwise, returning to step S4-2;
step S4-8, switching, by the security processor, the touch panel connection, enabling the touch panel to connect to the application processor, and returning the input security information operation response to the application processor.

10. The method according to claim 1, wherein,
the calculating the button disable threshold according to the preset time, checking the system setting and cancelling the automatic screen shutdown comprises: calling, by the application processor, a preset custom interface, setting an interface passed-in parameter as a first preset time, wherein the first preset time meets a first preset condition;
the restoring the automatic screen shutdown comprises: calling, by the application processor, the preset custom interface, setting the interface passed-in parameter as a second preset time, wherein the second preset time meets a second preset condition; and
checking the interface passed-in parameter when the interface is called, if the interface passed-in parameter meets the first preset condition, calculating the button disable threshold according to the interface passed-in parameter, checking the system setting and cancelling the automatic screen shutdown; if the interface passed-in parameter meets the second preset condition, restoring the automatic screen shutdown.

11. The method according to claim 10, wherein,
the setting the delay status comprises: assigning the first preset time to a delay time;
the cancelling the delay status comprises: assigning the second preset time to the delay time; and
the checking whether the current screen status is in the delay status comprises: checking the delay time, if a value of the delay time is equal to the first preset time, the current screen status is in the delay status; and if the value of the delay time is equal to the second preset time, the current screen status is not in the delay status.

12. An apparatus for preventing a processing by a security processor from being interrupted, comprising an application processor and a security processor which are configured to execute the following steps:
step S1, sending, by an application processor, a switching command to the security processor when starting a security information input page;
step S2, receiving, by the security processor, the switching command, switching a touch panel connection, enabling a touch panel to connect to the security processor, and returning a switching response to the application processor;
step S3, receiving, by the application processor, the switching response, setting a delay status, calculating a button disable threshold based on a preset time, checking a system setting, cancelling an automatic screen shutdown, and sending an input security information operation request to the security processor;
step S4, receiving, by the security processor, the input security information operation request, receiving security information input by a user through the touch panel, switching the touch panel connection when user confirming completed input information or user cancelling input information is received, or an input timeout is confirmed, enabling the touch panel to connect to the application processor, and returning an input security information operation response to the application processor;
step S5, receiving, by the application processor, the input security information operation response, closing the security information input page, cancelling the delay status, and restoring the automatic screen shutdown;
during a process flow of the step S1 to the step S5, executing, by the application processor, a power button processing flow when a power button is monitored to be pressed, and the power button processing flow comprises:
step P1, checking, by the application processor, a current screen status; if the current screen status is lit up, executing step P2; if the current screen status is turned off, executing step P3;
step P2, checking, by the application processor, whether the button disable threshold has not been exceeded and the current screen status is in a delay status; if so, stopping the power button processing flow; otherwise, executing a screen shutdown operation, and stopping the power button processing flow; and
step P3, executing, by the application processor, a screen lighting operation, and checking whether the current screen status is in the delay status; if so, disabling a screen locking mechanism, and stopping the power button processing flow; otherwise, enabling the screen locking mechanism, and stopping the power button processing flow.

13. The apparatus according to claim 12, wherein the security processor is further configured to:
set a timeout period after receiving the input security information operation request;
wherein the input timeout is that the user confirming completed input information or the user cancelling input information is not received during the timeout period; and
the timeout period is less than the preset time.

14. The apparatus according to claim 12, wherein the application processor is further configured to:
start a timer, and set a counting time as the preset time after receiving the switching response;
disable the timer after receiving the input security information operation response; and
timely check whether a timing of the timer has ended, when a checking result is that the timing of the timer has ended, cancel the delay status, and restore the automatic screen shutdown.

15. The apparatus according to claim 12, wherein the application processor is further configured to execute the following steps:
step P2-1, checking whether the current screen status is in the delay status; if so, executing step P2-2; otherwise, executing a screen shutdown operation, and stopping a current power button processing flow;
step P2-2, checking whether the button disable threshold has not been exceeded; if so, stopping the current power button processing flow; otherwise, executing step P2-3; and
step P2-3, cancelling the delay status, restoring the automatic screen shutdown, executing the screen shutdown operation, and stopping the current power button processing flow.

16. The apparatus according to claim 15, wherein, the application processor is further configured to obtain an automatic screen shutdown time in the system setting, save the obtained automatic screen shutdown time as temporary data, and set the automatic screen shutdown time in the system setting as preset data; and
the application processor is further configured to obtain the saved temporary data, change the automatic screen shutdown time in the system setting as the saved temporary date, and clear the saved temporary date.

17. The apparatus according to claim 16, wherein in the step P2-3, the application processor is further configured to check whether the saved temporary data exists; if so, cancel the delay status and restore the automatic screen shutdown, execute the screen shutdown operation, and stop the current power button processing flow; otherwise, execute the screen shutdown operation, and stop the current power button processing flow.

18. A terminal device, comprising: a processor and a memory;
wherein the memory is configured to store a computer program;
the processor is configured to execute the method according to claim 1 through calling the computer program.

19. A chip system, comprising a processor and an interface,
wherein the processor is configured to implement the method according to claim 1 through the interface.

20. A non-transitory computer-readable storage medium, configured to store a computer program which, when running in a computer, enables an application processor and a security processor contained in the computer to implement the following steps:
step S1, sending, by the application processor, a switching command to the security processor when starting a security information input page;
step S2, receiving, by the security processor, the switching command, switching a touch panel connection, enabling a touch panel to connect to the security processor, and returning a switching response to the application processor;
step S3, receiving, by the application processor, the switching response, setting a delay status, calculating a button disable threshold based on a preset time, checking a system setting, cancelling an automatic screen shutdown, and sending an input security information operation request to the security processor;
step S4, receiving, by the security processor, the input security information operation request, receiving security information input by a user through the touch panel, switching the touch panel connection when user confirming completed input information or user cancelling input information is received, or an input timeout is confirmed, enabling the touch panel to connect to the application processor, and returning an input security information operation response to the application processor;
step S5, receiving, by the application processor, the input security information operation response, closing the security information input page, cancelling the delay status, and restoring the automatic screen shutdown;
during a process flow of the step S1 to the step S5, executing, by the application processor, a power button processing flow when a power button is monitored to be pressed, and the power button processing flow comprises:
step P1, checking, by the application processor, a current screen status; if the current screen status is lit up, executing step P2; if the current screen status is turned off, executing step P3;
step P2, checking, by the application processor, whether the button disable threshold has not been exceeded and the current screen status is in a delay status; if so, stopping the power button processing flow; otherwise, executing a screen shutdown operation, and stopping the power button processing flow; and
step P3, executing, by the application processor, a screen lighting operation, and checking whether the current screen status is in the delay status; if so, disabling a screen locking mechanism, and stopping the power button processing flow; otherwise, enabling the screen locking mechanism, and stopping the power button processing flow.

* * * * *